United States Patent
Bird et al.

(10) Patent No.: US 9,353,574 B2
(45) Date of Patent: May 31, 2016

(54) ALIGNED ANGLED WELL TOOL WELD JOINT

(71) Applicant: HALLIBURTON ENERGY SERVICES, INC., Houston, TX (US)

(72) Inventors: Jay S. Bird, The Woodlands, TX (US); Randy C. Ivey, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 434 days.

(21) Appl. No.: 13/753,756

(22) Filed: Jan. 30, 2013

(65) Prior Publication Data

US 2013/0209164 A1 Aug. 15, 2013

(30) Foreign Application Priority Data

Feb. 14, 2012 (WO) ................ PCT/US2012/024996

(51) Int. Cl.
*E21B 17/04* (2006.01)
*E21B 10/00* (2006.01)
*B23K 9/00* (2006.01)
*B23K 15/00* (2006.01)

(52) U.S. Cl.
CPC . *E21B 10/00* (2013.01); *B23K 9/00* (2013.01); *B23K 15/0006* (2013.01); *E21B 17/04* (2013.01); *Y10T 403/477* (2015.01)

(58) Field of Classification Search
CPC ............................... E21B 17/04; E21B 17/046
See application file for complete search history.

(56) References Cited

U.S. PATENT DOCUMENTS

| 4,333,364 | A | 6/1982 | Varel |
| 4,830,408 | A * | 5/1989 | Reimert ........................ 285/27 |
| 7,472,764 | B2 | 1/2009 | Zahradnik et al. |
| 2005/0050726 | A1 | 3/2005 | Anderson et al. |
| 2006/0213693 | A1* | 9/2006 | Zahradnik et al. ............ 175/374 |
| 2009/0032310 | A1 | 2/2009 | Stevens et al. |
| 2010/0018353 | A1 | 1/2010 | Roth |
| 2010/0133805 | A1 | 6/2010 | Stevens et al. |
| 2010/0263935 | A1 | 10/2010 | Smith et al. |

(Continued)

FOREIGN PATENT DOCUMENTS

| CN | 101218413 A | 7/2008 |
| CN | 201100098 | 8/2008 |
| WO | 2009020901 A1 | 2/2009 |

OTHER PUBLICATIONS

International Search Report and Written Opinion issued Oct. 31, 2013 for PCT Patent Application No. PCT/US2012/024996, 11 pages.

(Continued)

*Primary Examiner* — David Bagnell
*Assistant Examiner* — Michael Goodwin
(74) *Attorney, Agent, or Firm* — Baker Botts L.L.P.

(57) ABSTRACT

A well tool can include multiple sections, one section having a mating weld surface formed thereon, and another section having another mating weld surface formed thereon. Engagement between the mating weld surfaces can prevent lateral displacement of the well tool sections relative to each other. The mating weld surfaces are welded to each other. A method of constructing a well tool can include engaging a mating weld surface on a section of the well tool with another mating weld surface on another section of the well tool, an interface between the mating weld surfaces being inclined relative to a longitudinal axis of the well tool extending through the sections, and welding the mating weld surfaces to each other along the interface.

29 Claims, 8 Drawing Sheets

(56) References Cited

U.S. PATENT DOCUMENTS

2013/0098690 A1* 4/2013 Hashem et al. ............ 175/325.5
2013/0207388 A1* 8/2013 Jansson et al. ................ 285/363

OTHER PUBLICATIONS

Halliburton Drawing No. SS31335, dated Nov. 22, 2011, 1 page.
Office Action, Australian Application No. 2012370313; 3 pages, May 25, 2015.
Office Action, European Application. No. 12868594.8; 7 pages, Jun. 23, 2015.
Office Action, Chinese Application. No. 201280069612.5; with English translation; 13 pages, Jul. 15, 2015.
Office Action, Canadian Application No. 2,862,114; 3 pages, Sep. 23, 2015.
Chinese Office Action, Application No. 201280069612.5; with translation; 15 pages, Mar. 15, 2016.

* cited by examiner

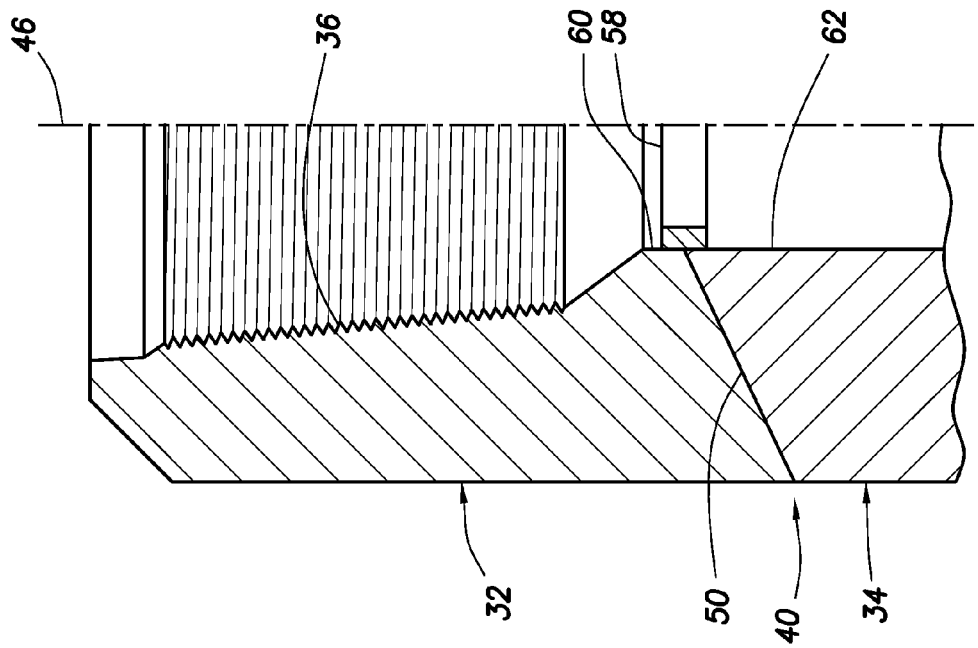
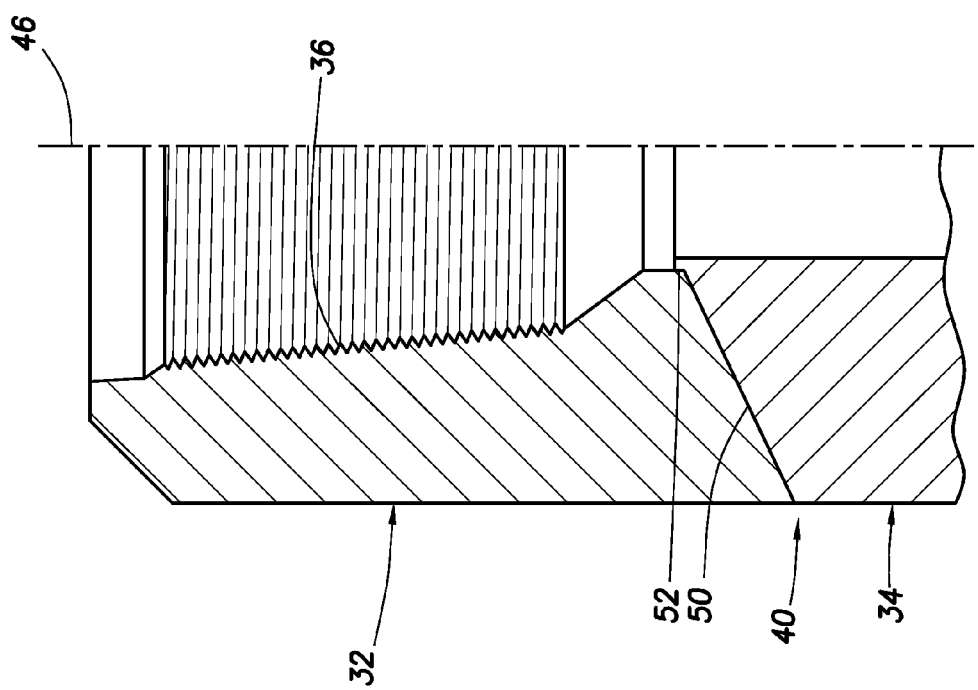

ALIGNED ANGLED WELL TOOL WELD JOINT

CROSS-REFERENCE TO RELATED APPLICATION

This application claims the benefit under 35 USC §119 of the filing date of International Application Serial No. PCT/US12/24996 filed 14 Feb. 2012. The entire disclosure of this prior application is incorporated herein by this reference.

BACKGROUND

This disclosure relates generally to equipment utilized and operations performed in conjunction with a subterranean well and, in one example described below, more particularly provides an aligned and angled well tool weld joint.

Various types of well tools (such as, drill bits, completion tools, measurement-while-drilling tools, directional drilling tools, sleeves, etc.) include weld joints. It will be appreciated that improvements are continually needed in well tool weld joints, for example, to enhance strength, fatigue resistance, etc., of the weld joints.

BRIEF DESCRIPTION OF THE DRAWINGS

FIGS. 5-12 are representative cross-sectional views of additional configurations of weld joints which may be used in well tools embodying principles of this disclosure.

DETAILED DESCRIPTION

Figure 1:
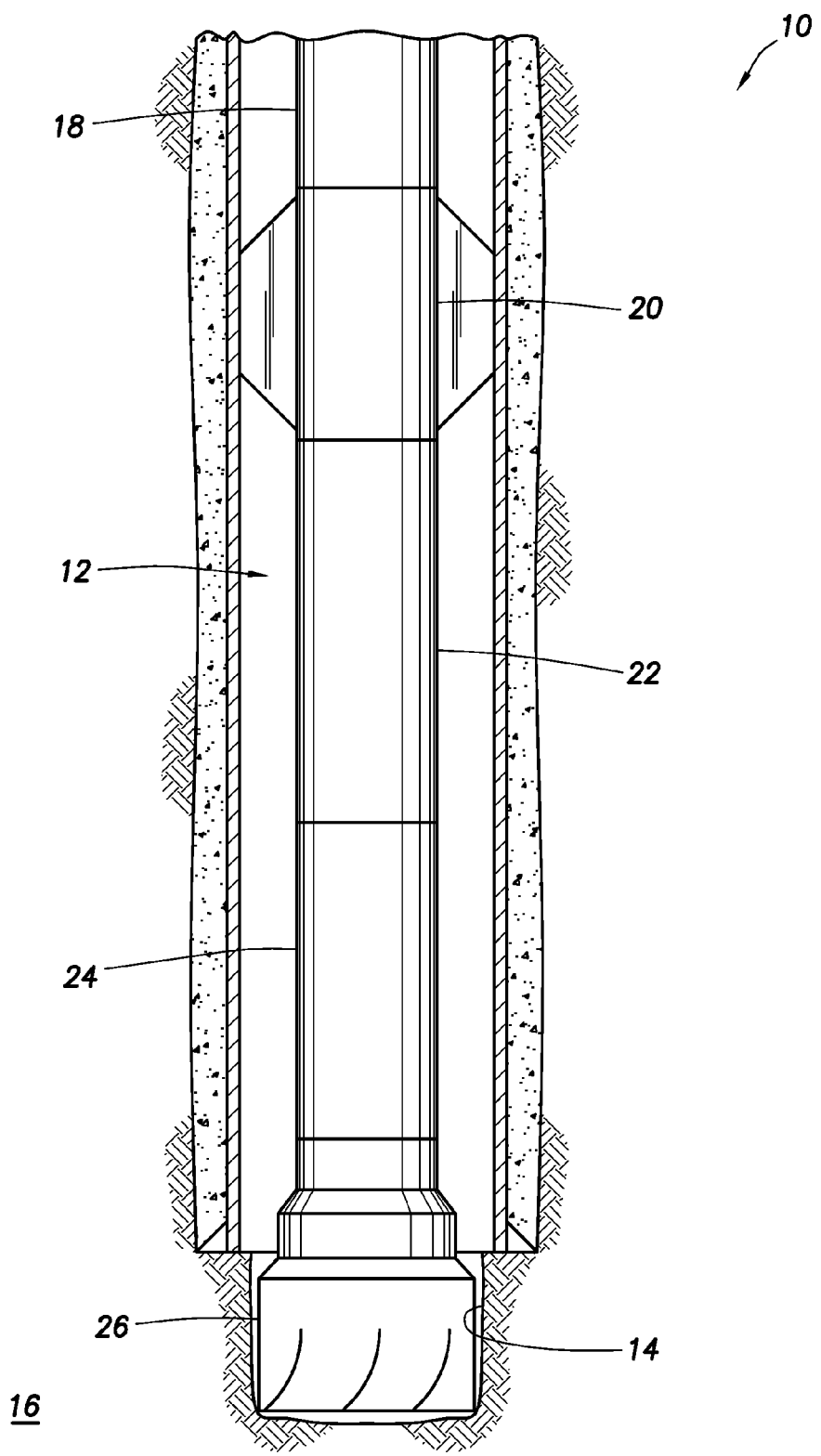
FIG. 1 is a representative partially cross-sectional view of a well system and associated method which can embody principles of this disclosure.

Representatively illustrated in FIG. 1 is a well system 10 and associated method which can embody principles of this disclosure. However, it should be clearly understood that the scope of this disclosure is not limited in any way to the details of the system 10 and method described herein or depicted in the drawings, since this disclosure's principles are applicable to a wide variety of different systems and methods. The system 10 and method of FIG. 1 comprise merely one non-limiting example of how those principles could be applied in actual practice.

As depicted in FIG. 1, a drill string 12 is used to drill a wellbore 14 into a subterranean formation 16. In this example, the drill string 12 includes a variety of well tools 18, 20, 22, 24, 26. The well tool 18 is a measurement-while-drilling tool (comprising sensors and telemetry communication devices, etc.), the well tool 20 is an adjustable stabilizer, the well tool 22 is a motor (such as, a Moineau-type motor, a turbine, etc.), the well tool 24 is a directional drilling tool for steering the drilling of the wellbore 14, and the well tool 26 is a drill bit.

Each of these well tools 18-26 can include a weld joint that can benefit from the principles described more fully below. However, the well tools 18-26 are merely a few examples of a wide variety of other well tools which can embody those principles. Therefore, it should be clearly understood that the scope of this disclosure is not limited to only the types of well tools described herein or depicted in the drawings.

Any types of well tools can embody the principles of this disclosure, whether or not those well tools are used in drilling operations. For example, packers, valves, side pocket mandrels, etc., used in completion operations could incorporate the weld joints described below.

Figure 2:
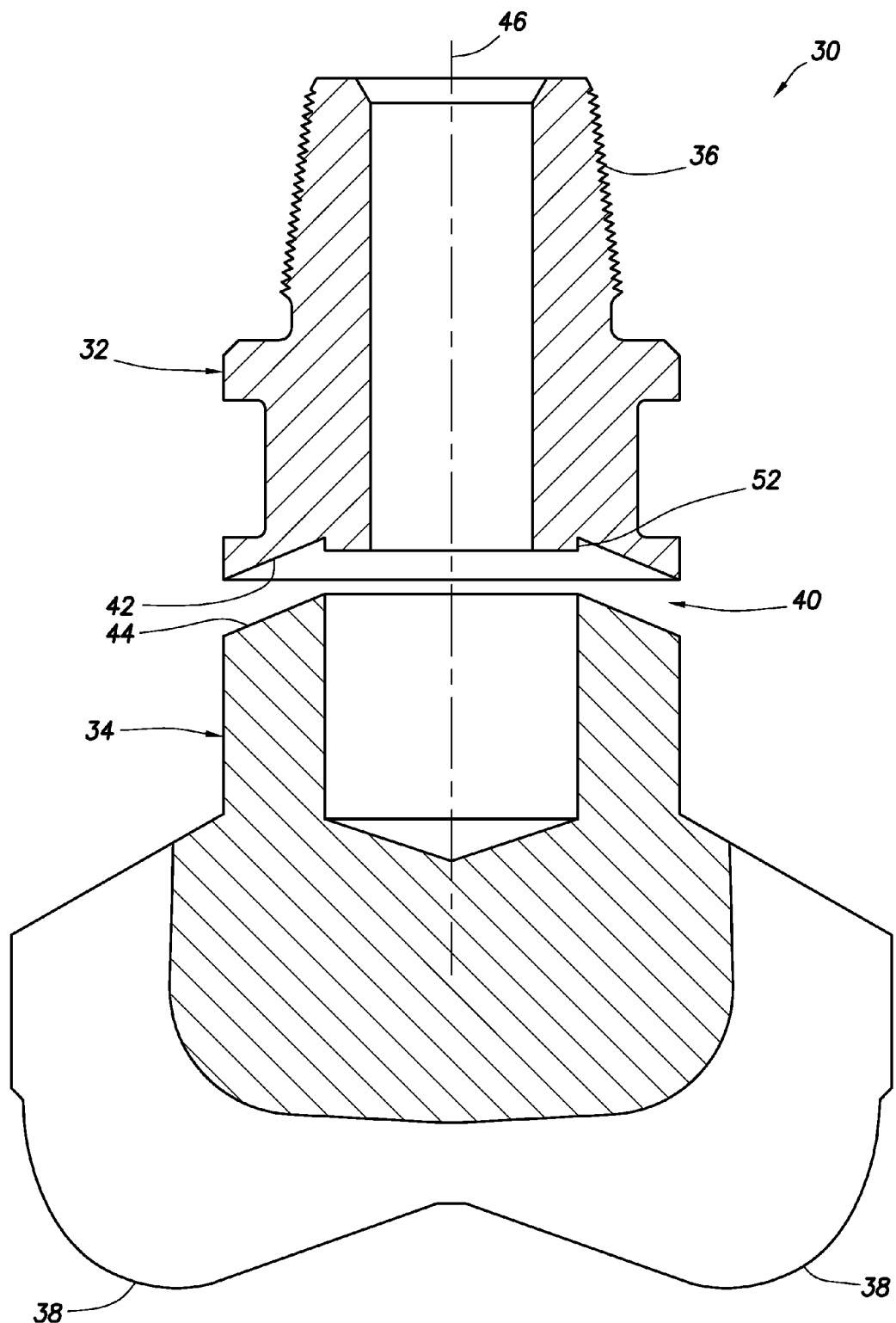
FIG. 2 is an enlarged scale representative cross-sectional view of a drill bit which can embody principles of this disclosure.

Referring additionally now to FIG. 2, an enlarged scale cross-sectional view of a drill bit 30 is representatively illustrated. The drill bit 30 may be used for the well tool 26 in the FIG. 1 system 10 and method, or the drill bit may be used in other systems and methods.

In the FIG. 2 example, the drill bit 30 comprises two sections 32, 34. The section 32 includes a connector 36 for connecting the drill bit 30 at an end of a drill string (such as the drill string 12 in FIG. 1).

As depicted in FIG. 2, the connector 36 comprises tapered external threads (e.g., an American Petroleum Institute-specified pin connector), but other types of connectors could be used, if desired. However, it is not necessary for the section 32 to include the connector 36 at all.

The section 34 includes cutters 38, e.g., for cutting into the formation 16 in the system 10 of FIG. 1. Although fixed cutters 38 are shown in FIG. 2, other types of cutters (such as, roller cone cutters, etc.) may be used, if desired. However, it is not necessary for the section 34 to include the cutters 38 at all.

By joining the section 32 to the section 34, the cutters 38 are thereby fixed relative to the connector 36, so that the drill bit 30 is fully assembled and can be connected in the drill string 12, whereby the cutters 38 can be used to drill the wellbore 14. A weld joint 40 is used for joining the sections 32, 34 to each other.

The weld joint 40 in this example includes mating weld surfaces 42, 44 formed on facing ends of the respective sections 32, 34. The surfaces 42, 44 are each inclined relative to a longitudinal axis 46 of the drill bit 30.

The surfaces 42, 44 are oblique relative to the longitudinal axis 46, in that the surfaces are neither parallel to, nor normal to, the longitudinal axis. The surfaces 42, 44 in this example are frusto-conical in shape.

In the lateral cross-section depicted in FIG. 2, the surfaces 42, 44 extend linearly in walls of the respective sections 32, 34. However, other shapes of the surfaces 42, 44 could be used if desired. For example, the surfaces 42, 44 could be curved, circular, parabolic or otherwise shaped.

The linear surfaces 42, 44 depicted in FIG. 2 are especially conducive to electron beam welding, since an electron beam is linear in form. Laser welding can also be used for welding together linear surfaces. Electron beam welding and laser welding are types of radiant heat welding.

However, in other examples, nonlinear surfaces can be welded by methods such as friction welding, etc. Friction welding is a type of solid state welding.

Electron beam welding can also be used to weld together nonlinear surfaces, e.g., by making multiple passes at incrementally changing depths, etc. Thus, it will be appreciated that the scope of this disclosure is not limited to any particular welding method used with any particular type of surfaces.

In the FIG. 2 example, when the surfaces 42, 44 are engaged with each other prior to welding, the sections 32, 34 are thereby axially aligned, due to the oblique shapes of the surfaces. Thus, contact between the surfaces 42, 44 prevents lateral displacement of the sections 32, 34 relative to each other.

This lateral securing and axial alignment conveniently enhances construction of the drill bit 30, since a separate alignment device and alignment procedure is not necessary. However, additional alignment devices and/or procedures may be used if desired. For example, in the FIGS. 2 & 3 example, an alignment shoulder 52 can be used in addition to the engaged surfaces 42, 44 for axially aligning the sections 32, 34.

Figure 3:
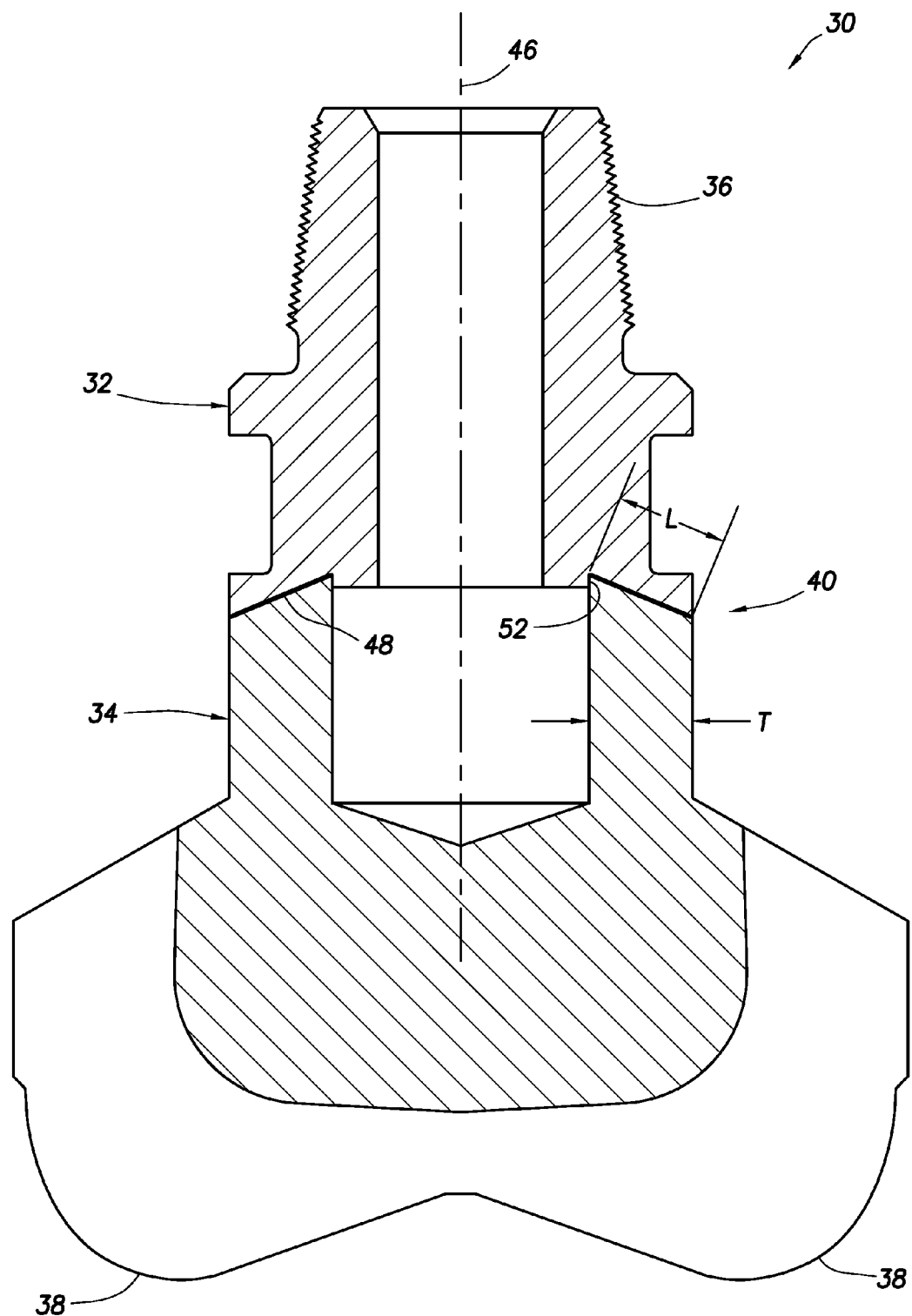
FIG. 3 is a representative cross-sectional view of the drill bit after sections of the drill bit have been welded to each other.

Referring additionally now to FIG. 3, the drill bit 30 is representatively illustrated after the surfaces 42, 44 have been engaged with each other, and a weld 48 has been formed between the surfaces 42, 44. The weld 48 extends along an interface 50 (see FIGS. 4-12) between the engaged surfaces 42, 44.

Note that a length L of the weld 48 is greater than a thickness T of the wall of the section 34. This obtains greater strength for the welded-together sections 32, 34. Thus, in addition to axially aligning the sections 32, 34, the surfaces 42, 44 also provide increased strength for the weld joint 40.

The weld length L may in other examples be greater than the wall thickness T of each of the sections 32, 34, or of only the section 32, or of neither of the sections 32, 34. The scope of this disclosure is not limited to any particular length of the weld 48 in comparison to any wall thickness.

Figure 4:
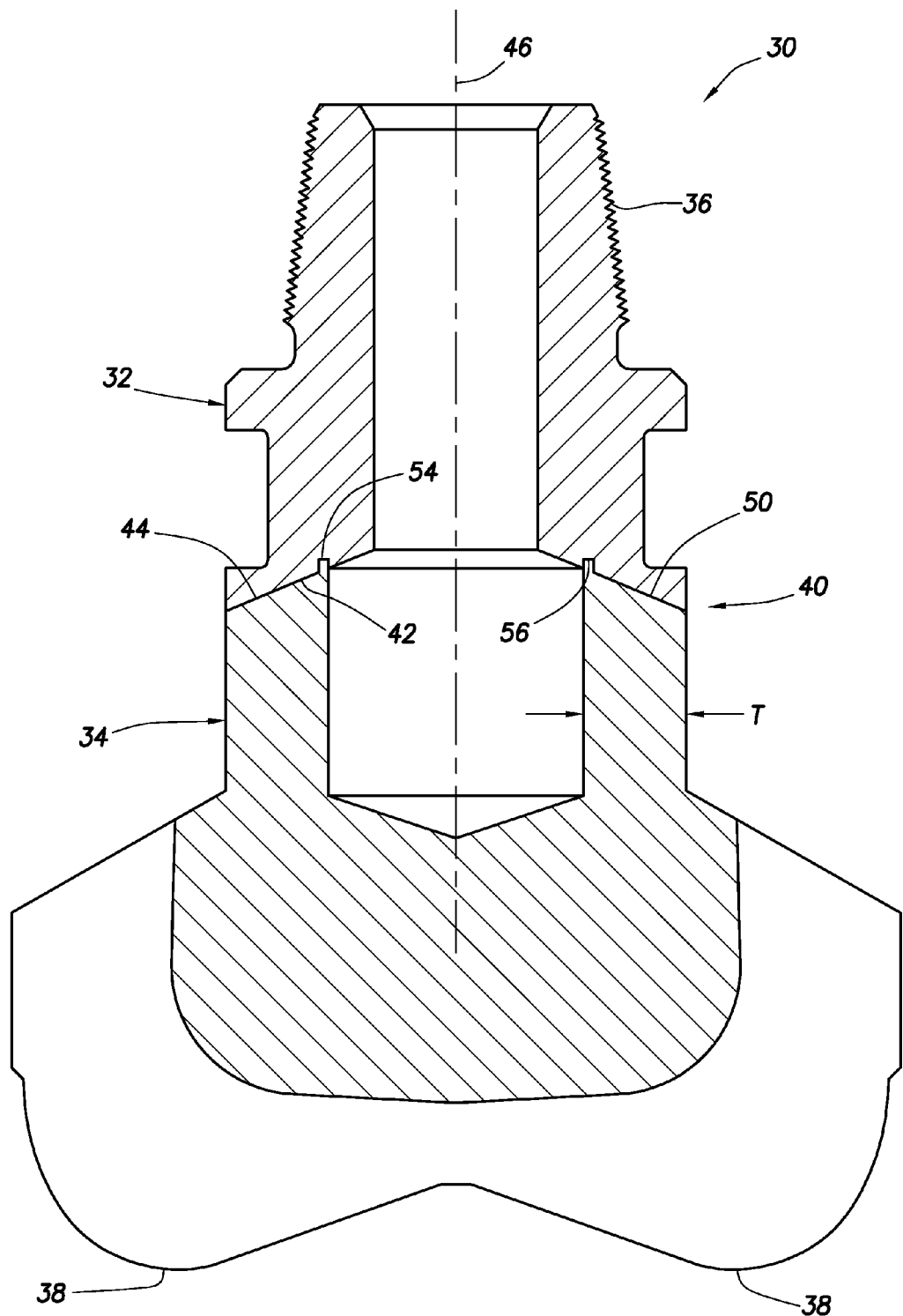
FIG. 4 is a representative cross-sectional view of another configuration of the drill bit.

Referring additionally now to FIG. 4, another configuration of the drill bit 30 is representatively illustrated. The drill bit 30 is depicted after the surfaces 42, 44 have been engaged with each other, but prior to the surfaces being welded to each other.

In this view, it may be clearly seen that the interface 50 extends linearly in the wall of the drill bit 30, the interface is longer than the thickness T of the section 34, and an alignment ring 54 formed on the section 34 is received in an annular recess 56 formed in an end of the section 32. However, in other examples, the interface 50 could be curved or otherwise nonlinear, the interface may be no longer than a wall thickness of either section 32, 34, and the alignment ring 54 and recess 56 may not be used.

Referring additionally now to FIGS. 5-12, additional examples of the weld joint 40 are representatively illustrated, after the surfaces 42, 44 have been engaged, but prior to welding the surfaces to each other. Any of the weld joints 40 described herein or depicted in the drawings may be used with any of the well tools 18, 20, 22, 24, 26 or the drill bit 30 described above, or with any other well tool.

Figure 5:
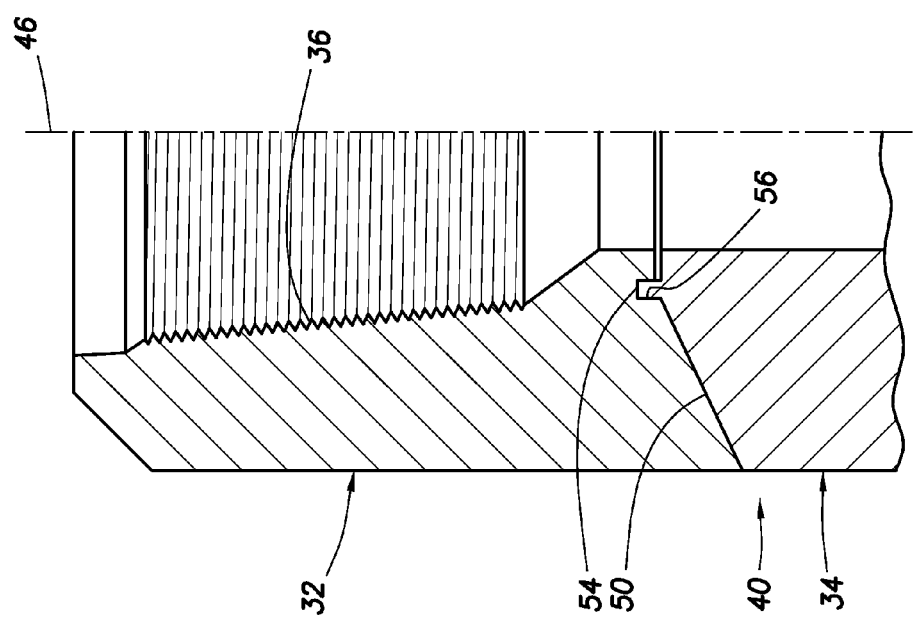

In the FIG. 5 example, the alignment ring 54 is received in the recess 56, similar to the configuration of FIG. 4. However, the connector 36 is formed as a tapered internal thread (e.g., an American Petroleum Institute-specified box connection). Other types of connectors may be used as desired, and it is not necessary for either of the sections 32, 34 to include any connector.

Figure 6:
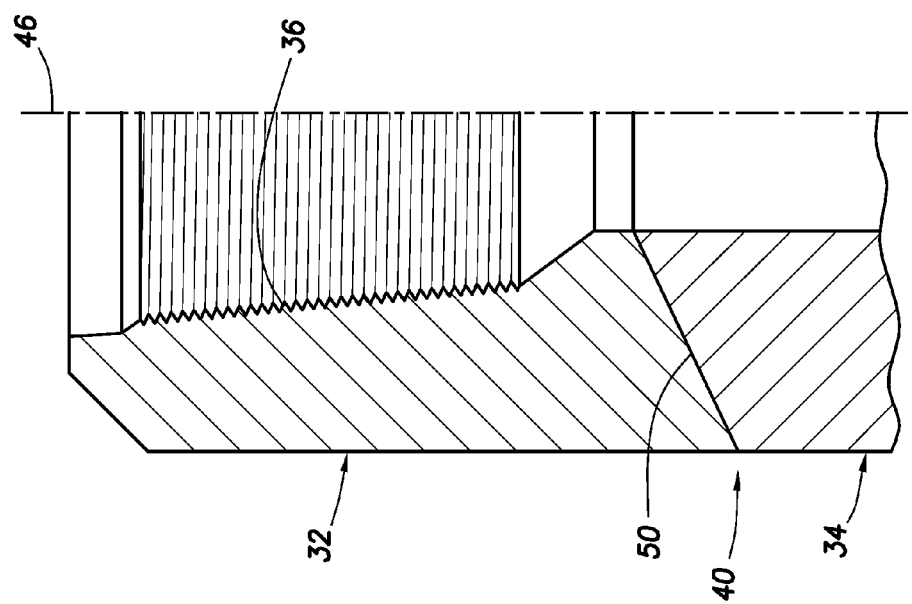

In the FIG. 6 example, the interface 50 (and the eventual weld 48) extends completely through the wall. In this example, the surfaces 42, 44 maintain alignment of the sections 32, 34 prior to welding, without use of any additional alignment device.

Figure 8:
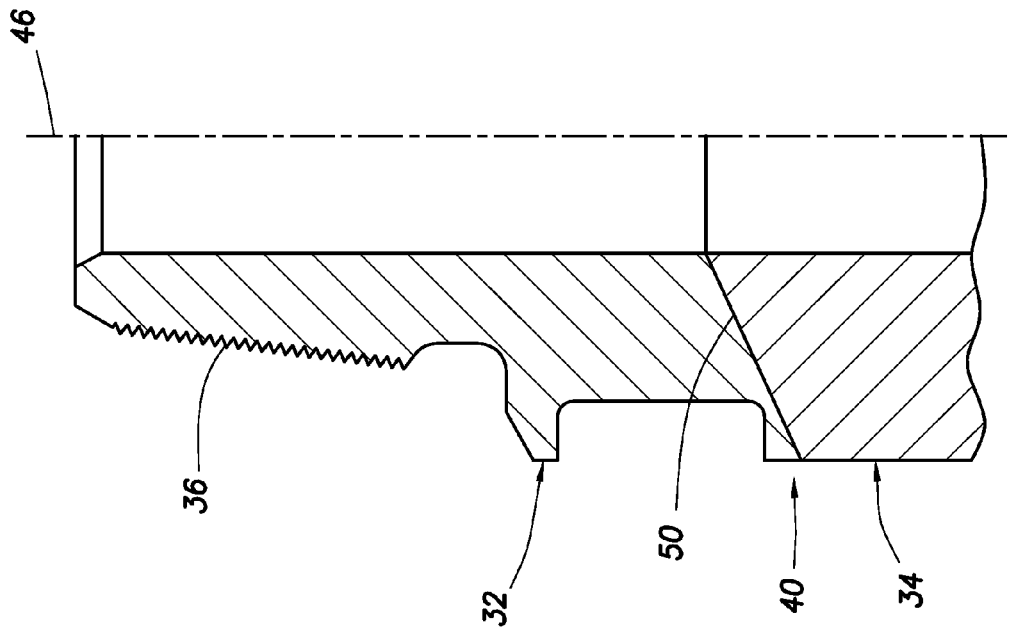
Figure 7:
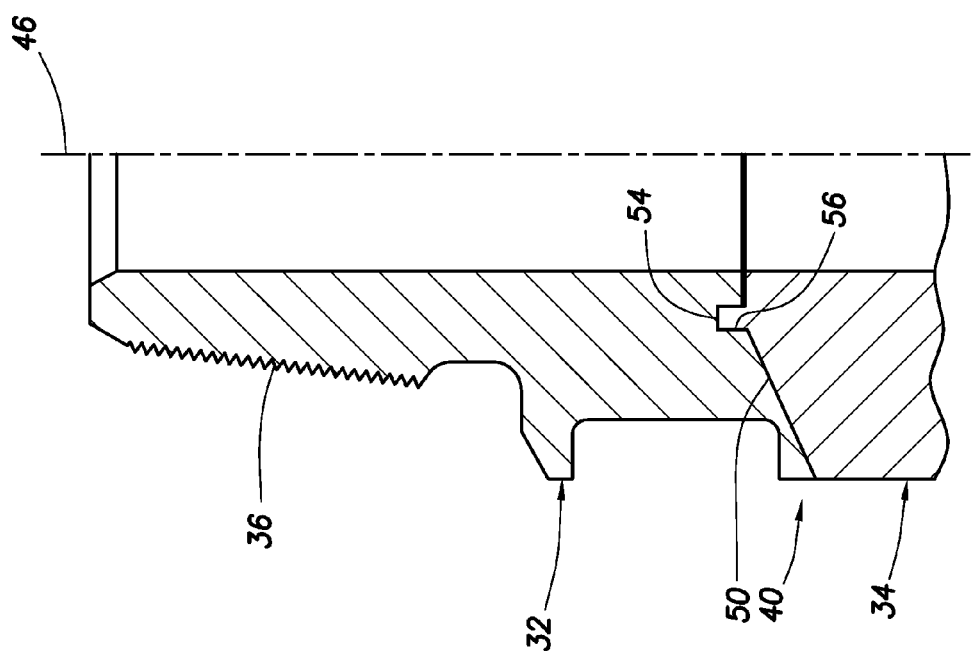

The FIGS. 7 & 8 examples are substantially similar to the respective FIGS. 5 & 6 examples. However, in the FIGS. 7 & 8 examples, the connectors 36 are externally threaded, instead of internally threaded as in the FIGS. 5 & 6 examples.

In the FIG. 9 example, the alignment shoulder 52 is formed on the section 34, instead of on the section 32 as in the example of FIGS. 2 & 3. In addition, the connector 36 is internally threaded.

In the FIG. 10 example, a separate alignment ring 58 is installed in bores 60, 62 of the respective sections 32, 34. In addition, the interface 50 (and the eventual weld 48) extends completely through the wall.

Figure 12:
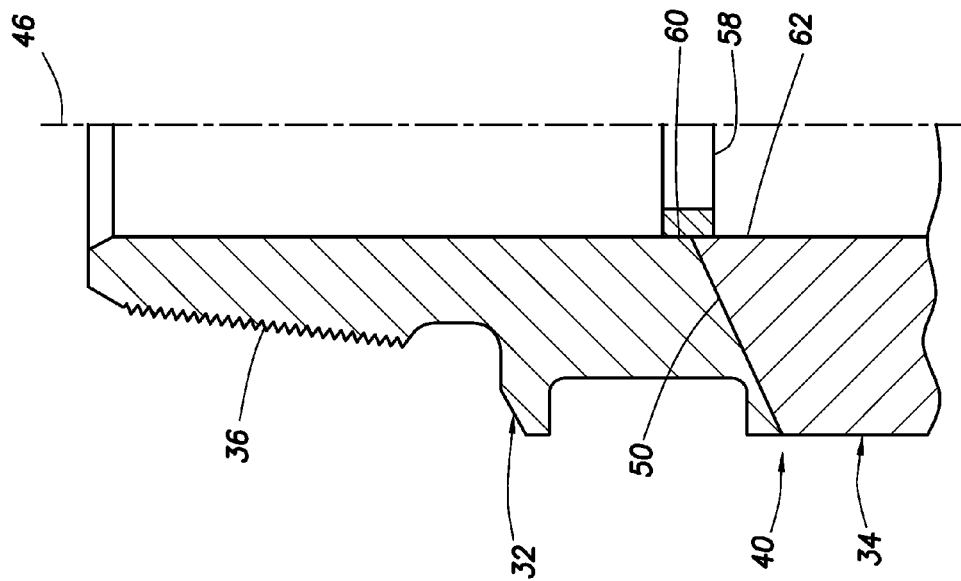
Figure 11:
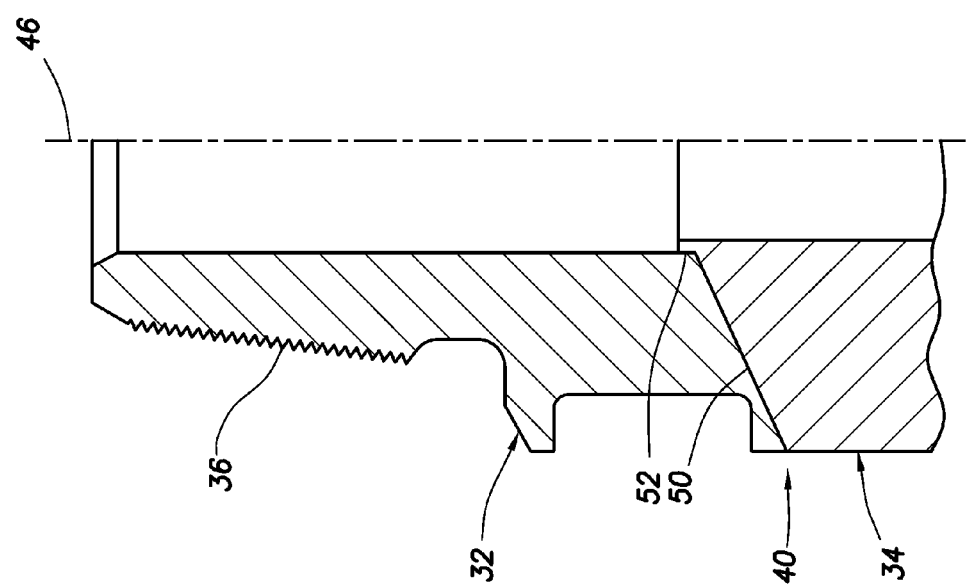

The FIGS. 11 & 12 examples are substantially similar to the respective FIGS. 9 & 10 examples. However, in the FIGS. 11 & 12 examples, the connectors 36 are externally threaded, instead of internally threaded as in the FIGS. 9 & 10 examples.

Note that, in the examples of FIGS. 6, 8, 10 and 12, each of the mating weld surfaces 42, 44 is equal in length to the interface 50 in the lateral cross-section. However, in other examples, either or both of the mating weld surfaces could be longer than the interface 50 in lateral cross-section.

It can now be fully appreciated that the above disclosure provides significant advancements to the art of constructing weld joints for well tools. The weld joints 40 described above can have increased strength, and can enhance economical production of the well tools in which they are used.

In some examples, the weld joint 40 can be used to weld together magnetic and non-magnetic materials. The weld joints 40 can be located in close proximity to matrix materials of the type used in drill bits.

A small heat affected zone can enable shortening of well tool assemblies. The well tool assemblies can also be made shorter by eliminating a width of a weld joint V-groove typically used to weld sections of well tools to each other.

For directional drilling, a shorter drill bit can more readily be steered. Shorter well tools of any type in a bottom hole assembly (e.g., below and including a directional drilling tool) can enhance steering.

The above disclosure describes a well tool 18, 20, 22, 24, 26 and drill bit 30 (which is also a well tool). In some examples, the well tool can include first and second sections 32, 34 of the well tool, the first section 32 having a first mating weld surface 42 formed thereon, and the second section 34 having a second mating weld surface 44 formed thereon. Engagement between the first and second mating weld surfaces 42, 44 prevents lateral displacement of the first and second sections 32, 34 relative to each other. The first and second mating weld surfaces 42, 44 are welded to each other.

At least one of the first and second mating weld surfaces 42, 44 can comprise a conical-shaped surface. Other shapes may be used if desired.

A length L of a weld 48 between the first and second mating weld surfaces 42, 44 may be greater than a wall thickness T of at least one of the first and second sections 32, 34. Other lengths and thicknesses may be used in other examples.

The first and second mating weld surfaces 42, 44 can be electron beam welded to each other. Other welding techniques may be used in other examples.

An interface 50 between the first and second mating weld surfaces 42, 44 may be linear in a lateral cross-section of the first and second sections 32, 34. Nonlinear interfaces may be used in other examples.

The interface 50 may be inclined relative to a longitudinal axis 46 of the well tool extending through the first and second sections 32, 34. The interface 50 may be longer in a lateral cross-section of the first and second sections 32, 34, as compared to a wall thickness T of at least one of the first and second sections 32, 34 in the lateral cross-section.

Also described above is a method of constructing a well tool 18, 20, 22, 24, 26, 30. In one example, the method can include engaging a first mating weld surface 42 on a first section 32 of the well tool with a second mating weld surface 44 on a second section 34 of the well tool, an interface 50 between the first and second mating weld surfaces 42, 44 being inclined relative to a longitudinal axis 46 of the well tool extending through the first and second sections 32, 34; and welding the first and second mating weld surfaces 42, 44 to each other along the interface 50.

The engaging step may prevent lateral displacement of the first and second mating weld surfaces 42, 44 relative to each other.

The method can include installing an alignment ring 58 in the first and second sections 32, 34, prior to the welding step.

A method of constructing a drill bit 30 for drilling a subterranean well is also described above. In one example, the method can include engaging first and second mating weld surfaces 42, 44 formed on respective first and second sections 32, 34 of the drill bit 30, the engaging preventing lateral displacement of the first and second sections 32, 34 relative to each other; and welding the first and second mating weld surfaces 42, 44 to each other.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. Accordingly, the foregoing detailed description is to be clearly understood as being given by way of illustration and example only, the spirit and scope of the invention being limited solely by the appended claims and their equivalents.

What is claimed is:

1. A well tool, comprising:
    a first section of the well tool having a first mating weld surface formed thereon, the first section including an annular recess extending into the first mating weld surface;
    a second section of the well tool having a second mating weld surface formed thereon, the second section including an alignment ring extending from the second mating weld surface to be received by the annular recess;
    the first and second mating weld surfaces engaged to axially align the first and second sections and prevent lateral displacement of the first and second sections relative to each other prior to welding; and
    the first and second mating weld surfaces are welded to each other.

2. The well tool of claim 1, wherein at least one of the first and second mating weld surfaces comprises a conical-shaped surface.

3. The well tool of claim 1, wherein a length of a weld between the first and second mating weld surfaces is greater than a wall thickness of at least one of the first and second sections.

4. The well tool of claim 1, wherein the first and second mating weld surfaces are electron beam welded to each other.

5. The well tool of claim 1, wherein an interface between the first and second mating weld surfaces is linear in a lateral cross-section of the first and second sections.

6. The well tool of claim 1, wherein an interface between the first and second mating weld surfaces is inclined relative to a longitudinal axis of the well tool extending through the first and second sections.

7. The well tool of claim 1, wherein an interface between the first and second mating weld surfaces is longer in a lateral cross-section of the first and second sections, as compared to a wall thickness of at least one of the first and second sections in the lateral cross-section.

8. The well tool of claim 1, wherein the first and second mating weld surfaces are radiant heat welded to each other.

9. The well tool of claim 1, wherein the first and second mating weld surfaces are solid state welded to each other.

10. The well tool of claim 1, wherein an interface between the first and second mating weld surfaces is equal in length to each of the first and second mating weld surfaces in a lateral cross-section of the first and second sections.

11. A method of constructing a well tool, the method comprising:
    prior to welding, engaging a first mating weld surface on a first section of the well tool with a second mating weld surface on a second section of the well tool to axially align the first and second sections and prevent lateral displacement of the first and second sections relative to each other, an interface between the first and second mating weld surfaces being inclined relative to a longitudinal axis of the well tool extending through the first and second sections, the first section including an annular recess extending into the first mating weld surface configured to receive an alignment ring extending from the second mating weld surface; and
    welding the first and second mating weld surfaces to each other along the interface.

12. The method of claim 11, wherein at least one of the first and second mating weld surfaces comprises a conical-shaped surface.

13. The method of claim 11, wherein a length of a weld between the first and second mating weld surfaces is greater than a wall thickness of at least one of the first and second sections.

14. The method of claim 11, wherein the welding comprises electron beam welding.

15. The method of claim 11, wherein the interface is linear in a lateral cross-section of the first and second sections.

16. The method of claim 11, wherein the interface is longer in a lateral cross-section of the first and second sections, as compared to a wall thickness of at least one of the first and second sections in the lateral cross-section.

17. The method of claim 11, wherein the welding comprises radiant heat welding.

18. The method of claim 11, wherein the welding comprises solid state welding.

19. The method of claim 11, wherein the interface is equal in length to each of the first and second mating weld surfaces in a lateral cross-section of the first and second sections.

20. A method of constructing a drill bit for drilling a subterranean well, the method comprising:
prior to welding, engaging first and second mating weld surfaces formed on respective first and second sections of the drill bit to axially align the first and second sections and prevent lateral displacement of the first and second sections relative to each other, the first section including an annular recess extending into the first mating weld surface configured to receive an alignment ring extending from the second mating weld surface; and
welding the first and second mating weld surfaces to each other.

21. The method of claim 20, wherein at least one of the first and second mating weld surfaces comprises a conical-shaped surface.

22. The method of claim 20, wherein a length of a weld between the first and second mating weld surfaces is greater than a wall thickness of at least one of the first and second sections.

23. The method of claim 20, wherein the welding comprises electron beam welding.

24. The method of claim 20, wherein an interface between the first and second mating weld surfaces is linear in a lateral cross-section of the first and second sections.

25. The method of claim 20, wherein an interface between the first and second mating weld surfaces is inclined relative to a longitudinal axis of the well tool extending through the first and second sections.

26. The method of claim 20, wherein an interface between the first and second mating weld surfaces is longer in a lateral cross-section of the first and second sections, as compared to a wall thickness of at least one of the first and second sections in the lateral cross-section.

27. The method of claim 20, wherein the welding comprises radiant heat welding.

28. The method of claim 20, wherein the welding comprises solid state welding.

29. The method of claim 20, wherein an interface between the first and second mating weld surfaces is equal in length to each of the first and second mating weld surfaces in a lateral cross-section of the first and second sections.

* * * * *